United States Patent
Medlicott

(10) Patent No.: US 10,539,181 B1
(45) Date of Patent: Jan. 21, 2020

(54) MODULAR LINEAR MOTION CARRIAGE ASSEMBLY, FOR USE ON RAILS SUCH AS THOSE WITH RECTANGULAR PROFILES

(71) Applicant: Giles Medlicott, Bellingham, WA (US)

(72) Inventor: Giles Medlicott, Bellingham, WA (US)

(73) Assignee: Tolen Engineering LLC, Bellingham, WA (US)

( * ) Notice: Subject to any disclaimer, the term of this patent is extended or adjusted under 35 U.S.C. 154(b) by 0 days.

(21) Appl. No.: 16/168,831

(22) Filed: Oct. 24, 2018

(51) Int. Cl.
| | |
|---|---|
| *F16C 29/04* | (2006.01) |
| *F16C 29/12* | (2006.01) |
| *F16C 13/00* | (2006.01) |
| *B23Q 1/40* | (2006.01) |
| *B23Q 1/42* | (2006.01) |
| *B23Q 1/52* | (2006.01) |

(52) U.S. Cl.
CPC ............... *F16C 29/04* (2013.01); *B23Q 1/40* (2013.01); *B23Q 1/42* (2013.01); *B23Q 1/522* (2013.01); *F16C 13/006* (2013.01); *F16C 29/12* (2013.01); *F16C 29/126* (2013.01)

(58) Field of Classification Search
CPC ...... F16C 13/006; F16C 29/04; F16C 29/045; F16C 29/12; F16C 29/126; B23Q 1/14; B23Q 1/42; B23Q 1/522; B23Q 1/54
USPC ......... 384/13, 50, 55, 57, 58, 548, 549, 562, 384/565, 586; 16/91, 96 R, 106; 403/373; 310/12.02, 12.24
See application file for complete search history.

(56) References Cited

U.S. PATENT DOCUMENTS

| | | | | |
|---|---|---|---|---|
| 2,519,101 | A * | 8/1950 | Bardet | B23Q 1/40 384/52 |
| 2,525,712 | A * | 10/1950 | Neighbour | B23D 47/02 384/55 |
| 3,004,802 | A * | 10/1961 | Maurer | A47C 3/30 254/93 R |
| 3,552,805 | A * | 1/1971 | Dunlap | B23Q 1/40 384/55 |
| 4,375,195 | A * | 3/1983 | Tsuboi | B61B 13/06 104/246 |
| 4,623,201 | A * | 11/1986 | Gallone | F16C 29/045 384/53 |
| 4,867,579 | A * | 9/1989 | Gallone | F16C 29/045 384/53 |
| 5,341,751 | A * | 8/1994 | Cuneo | B23Q 1/01 108/143 |
| 5,620,259 | A * | 4/1997 | Mainardi | F16C 29/045 384/53 |
| 5,735,214 | A * | 4/1998 | Tsuboi | F16C 29/005 104/106 |
| 7,350,270 | B2 * | 4/2008 | Fournier | F16C 13/006 16/91 |

(Continued)

*Primary Examiner* — Marcus Charles

(57) ABSTRACT

An adjustable linear motion carriage assembly is configured to ride on a rail (34, 220) with generally parallel opposing faces in a linear motion of travel along the central axis of the rail. The carriage assembly includes at least one carriage member (32, 140, 160, 261) comprising a frame (40, 150, 170, 270) supporting a plurality of bearings (62). The carriage member can be used singularly or assembled together to provide control over desired degrees of freedom of the carriage assembly. The individual carriage member frames can flex by elastic displacement near the bearing location (122, 142, 162) to accommodate rails with minor variations in width.

22 Claims, 13 Drawing Sheets

(56) References Cited

U.S. PATENT DOCUMENTS

| | | | |
|---|---|---|---|
| 8,070,361 B2* | 12/2011 | Schroeder | F16C 29/045 |
| | | | 384/57 |
| 8,434,946 B2* | 5/2013 | Watson | F16C 29/004 |
| | | | 384/55 |
| D800,189 S * | 10/2017 | Hynek | D15/143 |
| 9,828,179 B2* | 11/2017 | Prussmeier | B65G 54/02 |
| 2013/0193777 A1* | 8/2013 | Sommerhalter, Jr. | |
| | | | H02K 41/031 |
| | | | 310/12.02 |

* cited by examiner

MODULAR LINEAR MOTION CARRIAGE ASSEMBLY, FOR USE ON RAILS SUCH AS THOSE WITH RECTANGULAR PROFILES

TECHNICAL FIELD

This disclosure generally relates to linear motion carriage assemblies, more particularly but not exclusively to linear motion carriage assemblies employing rails with rectangular profiles.

BACKGROUND ART

Previous linear motion carriage assemblies have guide rails that are unique aluminum extrusions or unique ground steel profiles that rely on features in the extrusion or rails to secure linear travel. These features are either V-grooves in the rectangular or square cross-section aluminum extrusions, or salient opposing triangular sections in unique aluminum extrusions, or groves in ground steel rails.

Linear motion assemblies built with rails having V-grooves or proud features rely on bearing wheels that have multiple angled contact surfaces to constrain degrees of freedom to allow for strict linear motion along one axis.

FIG. 1 shows prior art, with a linear motion apparatus 10 using an aluminum extrusion 20 having a V-slot profile 19, with mating radial bearing wheels 12 that contain a similar V-profile for their contact surfaces 13. The radial bearing wheels 12 include two radial cartridge bearings 15 with a spacer 16 in between the bearings 15, and an outer wheel plastic material 14. The exterior races of the bearings 15 are secured in the outer wheel material 14 by a slight compression fit. The radial bearing wheels 12 are secured to a frame 11 each by a threaded bolt fastener 21 and threaded nut fastener 22, with either a tubular spacer 17 or an eccentric nut spacer 18 ensuring the frame 11 doesn't contact the extrusion 20. Preload of the radial bearing wheel 12 preload is set by adjusting the eccentric nut spacer 18, then securing the fasteners 21 & 22.

SUMMARY OF INVENTION

In one aspect, a carriage assembly is provided. The carriage assembly includes at least one carriage member comprising of a frame, with the frame including at least two bearing apertures, at least two normal coupling apertures, at least one lateral coupling aperture, at least two bearing clearance cavities, and a plurality of mounting apertures. The normal coupling apertures are oriented normal to the outer frame face. The lateral coupling apertures are located parallel the outer frame face. The bearing apertures are located perpendicular the outer frame face. The bearing clearance cavity extends in the frame normal to the outer face and opens on the opposite frame face. The mounting apertures open on the outer frame face.

In one embodiment, the carriage assembly further includes two radial cartridge bearings each secured to two respective bearing apertures by respective bearing fasteners. In one embodiment, the bearing aperture of the frame further includes a threaded insert.

In one embodiment, each normal coupling aperture is configured to receive a coupling fastener normal to the outside frame face, while the normal coupling apertures along one side of the frame also include a threaded insert.

In one embodiment, the carriage assembly comprises at least two carriage members that are joined at right angles to each other. The carriage members are secured by coupling fasteners. The coupling fasteners secure the frames together connecting the normal coupling apertures of the first frame to the lateral coupling apertures of the second frame.

In one embodiment, the carriage assembly comprises at least three carriage members that are joined abutting and adjacent at right angles. The carriage members are secured by coupling fasteners. The coupling fasteners secure the frames together connecting the normal coupling apertures of the first frame to the lateral coupling apertures of the second frame to the normal coupling apertures of the third frame.

In one embodiment, the carriage members vary in size to allow use with rails having adjacent faces of different lengths. Carriage members of different sizes can accommodate generally rectangular cross-sections with adjacent sides of different lengths.

In one embodiment, the carriage member frame further includes a frame material arrangement where the bearing apertures are connected to the frame by cantilevered arms configured to allow displacement relative to the side of the frame. The bearing apertures and therefore the bearing contact faces accommodate rails of varying width by the elastic displacement of the frame material.

In one embodiment, the carriage member frame mounting apertures comprise a pass-through hole for a fastener, and a larger exterior recess and radially places ears to locate a mounted component and prevent rotation about the through-hole axis. In one embodiment, the apertures further include a brass insert fastener terminating the through-hole.

In one embodiment, the linear motion carriage assembly member frame is made from acrylonitrile butadiene styrene plastic.

In one embodiment, the carriage member includes a dovetail coupling at one end of the carriage frame, and a dovetail receptacle at the other end of the carriage frame. In one embodiment, the carriage assembly includes two carriage members with dovetails, and a carriage member spacer with a dovetail coupling at one end and a dovetail receptacle at the other end. The first carriage member is joined to the spacer by a dovetail joint, while the second carriage member is joined to the other end of the spacer by another dovetail joint.

In another aspect, a carriage assembly is provided. The carriage assembly includes at least one carriage member comprising of a frame, with the frame including at least two bearing apertures, cantilevered arms securing the bearing apertures to the frame, at least two normal coupling apertures, at least one lateral coupling aperture, and a plurality of mounting apertures. The normal coupling apertures are oriented normal to the outer frame face. The lateral coupling apertures are located parallel the outer frame face. The bearing apertures are located perpendicular the outer frame face. The mounting apertures open on the outer frame face.

In one embodiment, the carriage assembly further comprises a first a second radial cartridge bearing in a corresponding first and second bearing aperture. Each bearing is coupled to the bearing aperture by a bearing fastener. In one embodiment, the bearing apertures further include a threaded insert. In one embodiment, the carriage member frame mounting apertures comprise a pass-through hole for a fastener, and a larger exterior recess and radially places ears to locate a mounted component and prevent rotation about the through-hole axis.

In another aspect, a linear motion apparatus is provided. The linear motion apparatus includes a rail having a generally rectangular cross-section, and a carriage assembly including at least one carriage member. The carriage member comprises a frame, at least two radial cartridge bearings, and fasteners to secure the bearings to the frame bearing apertures. The frame further includes normal coupling apertures and lateral coupling apertures, as well as mounting apertures.

In one embodiment, the carriage assembly further includes three other carriage members for a total of four carriage members. In one embodiment, the four carriage members are joined together by coupling fasteners, which pass through the normal coupling apertures of one frame, the lateral coupling apertures of the adjacent frame, and into the normal coupling apertures of the opposite frame.

Other aspects, advantages and novel features of the invention will become apparent from the following detailed description of the invention when evaluated in conjunction with the accompanying drawings.

DETAILED DESCRIPTION

Figure 1:
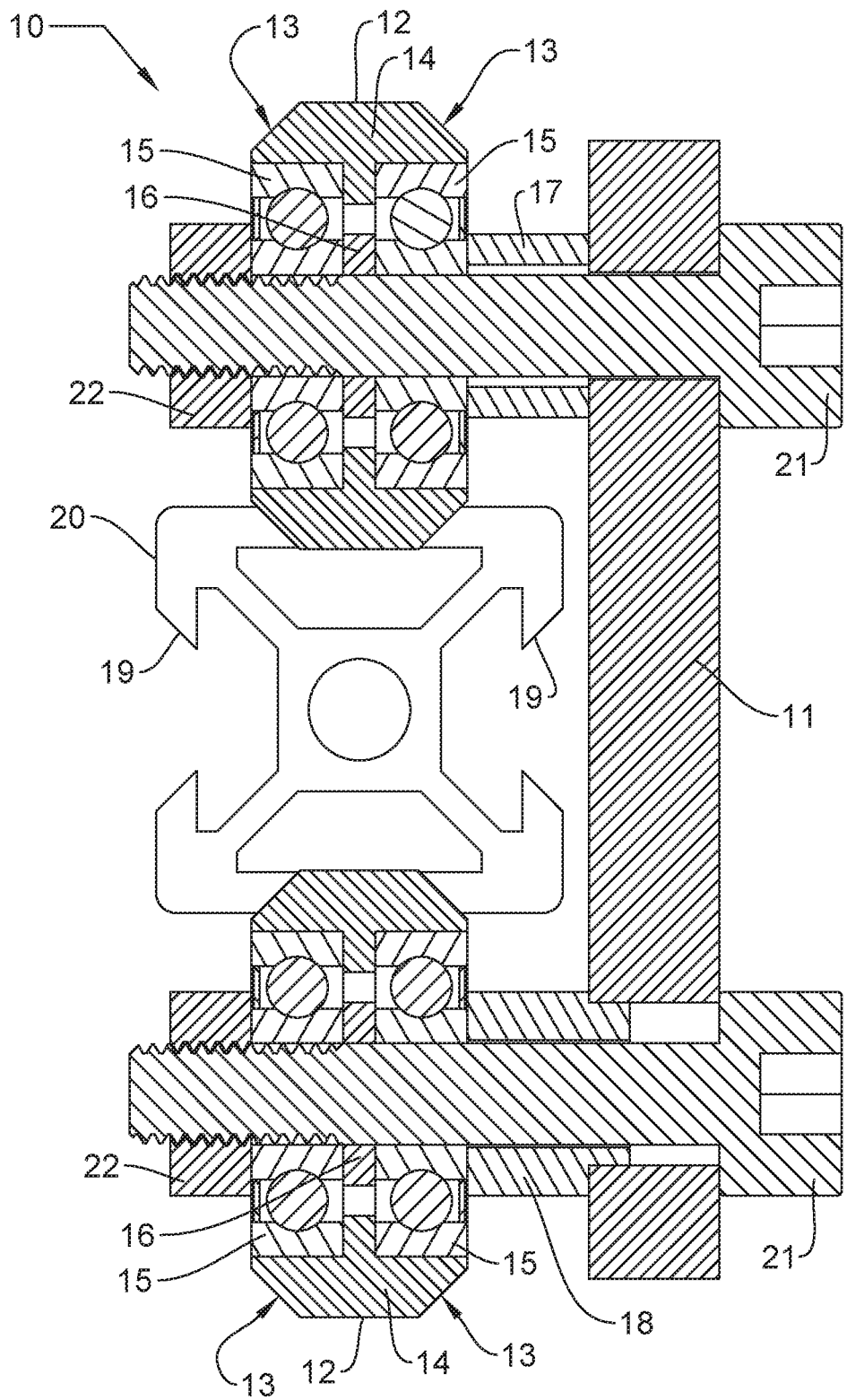
FIG. 1 is an end section view of prior art.

The prior art arrangement of FIG. 1 relies by design on aluminum extrusions 20 with V-slot profiles 19, which are a small minority of all aluminum extrusions generally used as structural support. Furthermore, the V-slot profile 19 can vary from one manufacturer to another. Other aluminum extrusions with salient triangular sections or steel ground rails also lack universality.

The prior art arrangement of FIG. 1 relies on the contact between the radial outer wheel material 14 and the extrusion V-slot profile 19 to limit rotation about the axis of travel along the extrusion 20. Due to the differences in radius of the contact from the outer edge of the wheel 12 to the largest diameter portion, the contact surface 13 of the wheel 12 do not purely roll along the V-slot profile 19, but scrub the portion with the least contact force resulting in increased rolling friction compared to a wheel with a contact face being a constant radius from the wheel axis.

The prior art arrangement of FIG. 1 accomplishes adjustment for carriage bearing preload by the use of an eccentric nut spacer 18. This design relies on the plastic outer wheel material 14 to conform to differences in distances between the V-slot profiles 19, resulting in a higher contact friction when the minimum condition in encountered. Lastly the complete assembly is both quite large and of greater mass than could be desired.

Furthermore, in the prior art arrangement of FIG. 1, no provision to allow movement of the carriage other than in the direction of linear travel is provided. This is also true for linear motion assemblies having rails with proud features, or rails with grooves. This leads to over-constrained carriages and binding in structures having two or more linear motion assemblies arranged along generally parallel axes, as it is difficult to align the axes perfectly parallel.

Thus some embodiments provide a linear motion carriage assembly that can work with more common rails with generally parallel opposing faces than the V-groove rails that the prior art carriages necessitate. Some embodiments provide a linear motion carriage assembly that contacts generally parallel opposing surfaces of the rail for the bearings wheels which leads to reduced rolling friction than the prior art. Some embodiments provide a linear bearing carriage assembly greater able to resist rotation about the central axis of the rail due to a greater distance from the rail center axis to the bearing wheel than the prior art. Some embodiments provide a multiple member linear motion carriage assembly that is more configurable to alleviate binding in multiple carriage and rail assemblies than the prior art. These and other benefits will become more apparent in the following description and accompanying figures.

Figure 2:
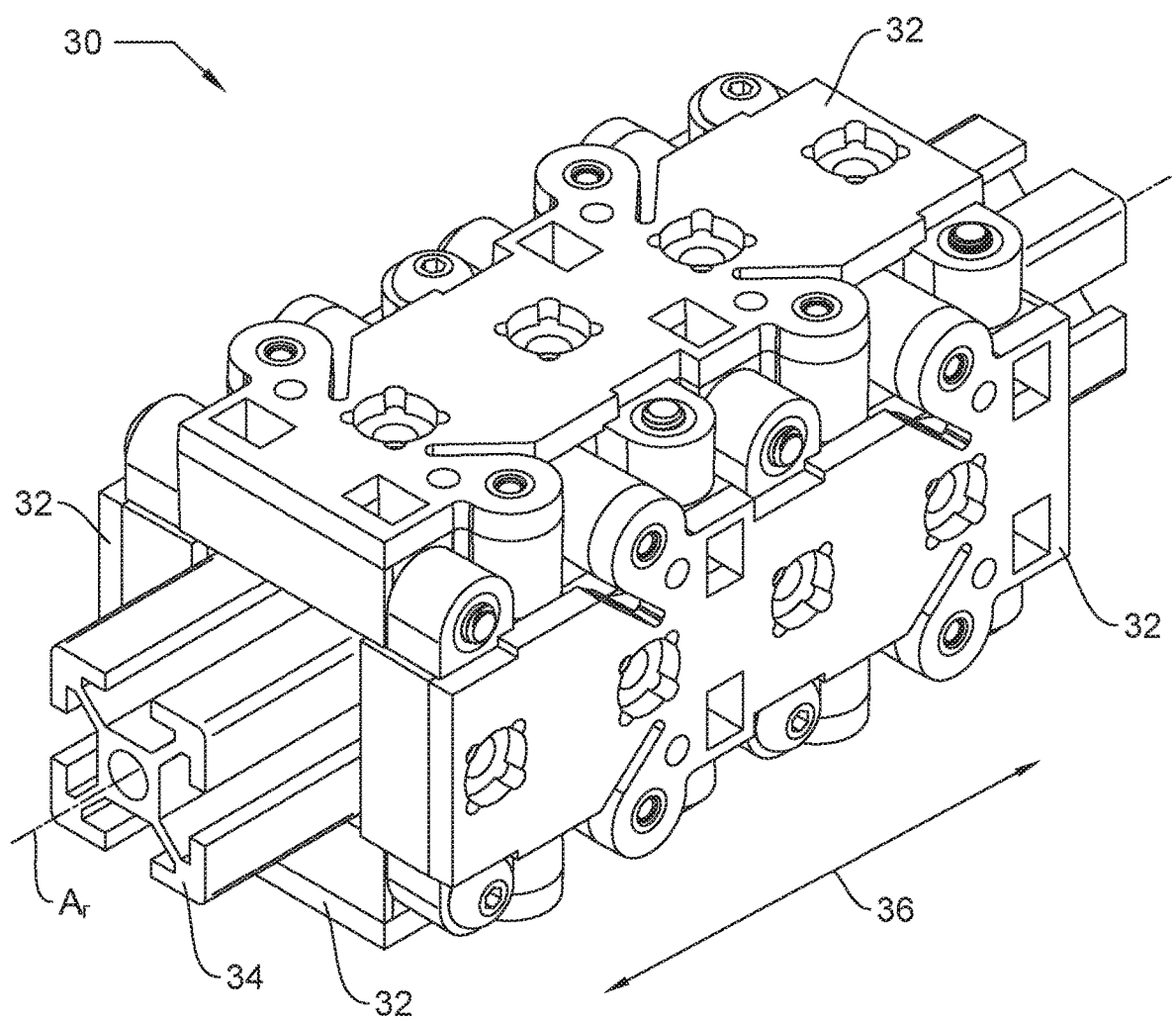
FIG. 2 is an isometric view of a linear motion carriage assembly and rail in one embodiment.

FIG. 2 shows an embodiment of a linear motion carriage assembly 30, with a plurality of modular carriage members 32 arranged around the exterior of a rail 34 having generally parallel opposing faces and a central axis Ar. The rail 34 of this embodiment has a generally rectangular cross-section or profile. In this embodiment, four carriage members 32 are shown. In this arrangement, the carriage members 32 contact all faces of the rail 34 to provide constraint in all degrees of freedom with the exception of the desired direction of travel 36 along the axis Ar of the rail 34. Other suitable arrangements of carriage members 32 around the rail 34 are also envisioned providing some degree of freedom for slight lateral movement or rotational movement where multiple linear motion carriage assemblies are located along separate rails with generally parallel axes.

The rail 34 used for a guide rail in this embodiment has parallel opposing faces forming a square cross-section with T-slots. This profile is commonly referred to as Bosch Rexroth extrusion, and is manufactured from aluminum. This rail 34 profile is ubiquitous for use as a structural support within industry and with hobbyist alike. Many manufacturers produce similar rails 34 or extrusions with slight variation in the profile geometry, though the exterior envelope is nearly identical between manufacturers, with an industry accepted JIS standard for metric products for maximum and minimum allowable material conditions.

The distances between generally parallel opposing faces in the embodiment of rectangular extruded rails 34 can vary for example plus or minus 0.41 millimeters for a 20 millimeter square extrusion, though in practice almost all extrusions are within the range of 20.02 millimeters to 19.90 millimeters. Thus the carriage member 32 only needs to provide accommodation over a small range to still maintain contact to the rail 34. Other profiles for rails 34 manufactured by extrusion are envisioned, including but not limited to rectangular profiles with dissimilar length sides, square or rectangular profiles with no negative cavities being generally of hollow square shape, or T-slot profiles with V-groves on the leading edge of the T-slot indentation, amongst other combinations. Furthermore, embodiments are envisioned for use with other profiles for rails 34 including those formed out of steel or aluminum I beam or double T beam, by process of welding or extrusion, or rectangular steel or aluminum profiles formed from seam welded sheet.

Figure 3:
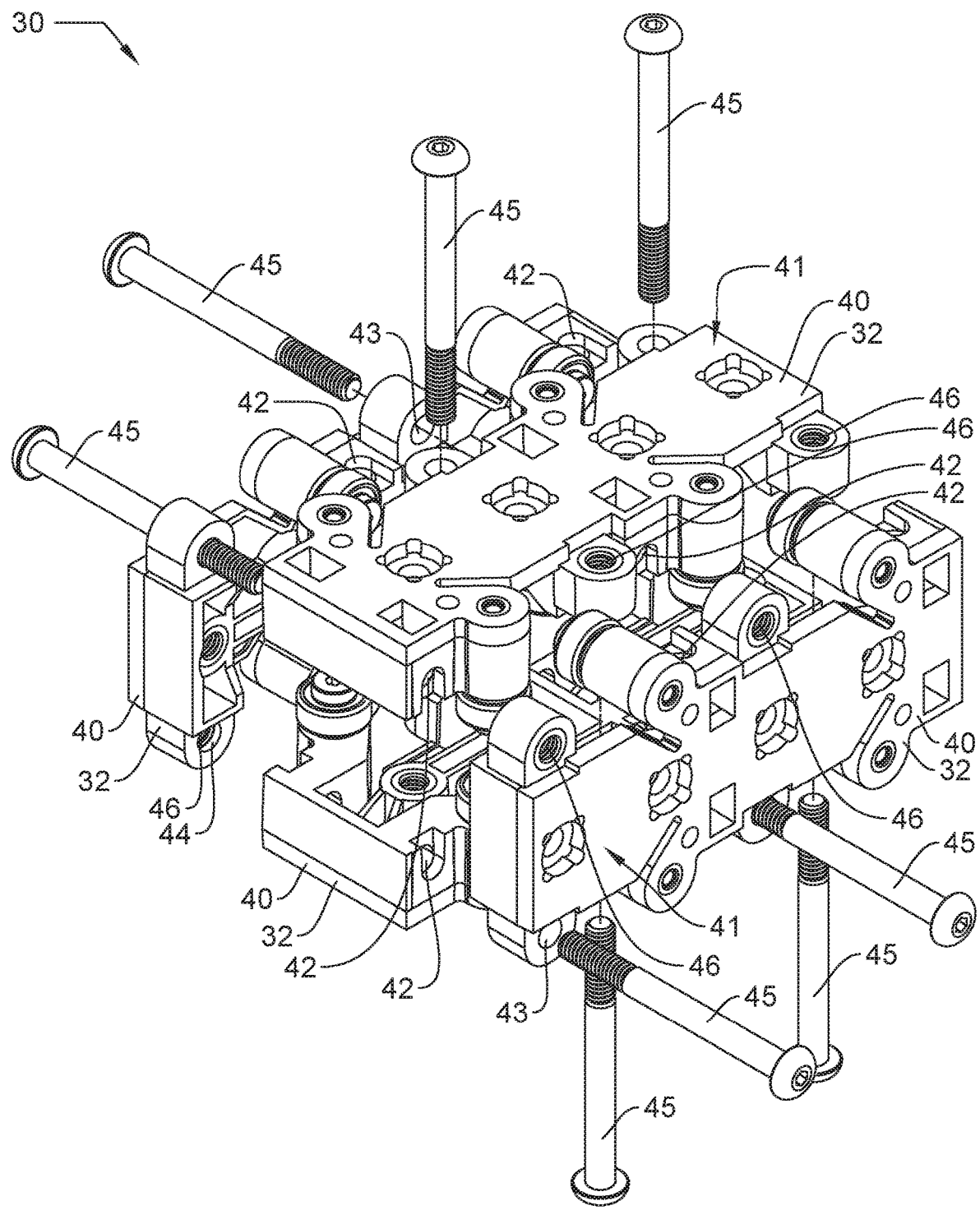
FIG. 3 is an isometric exploded view of the linear motion carriage assembly of FIG. 2 in one embodiment.

FIG. 3 shows an exploded view of the linear motion carriage assembly of FIG. 2, with four carriage members 32, each fastened adjacent and abutting, using threaded coupling fasteners 45, two of each of which are used for each carriage member 32, resulting in eight coupling fasteners 45 total for this embodiment. Each carriage member 32 includes a frame 40, of injection molded acrylonitrile butadiene styrene plastic, which is generally symmetric about a plane perpendicular to the frame exterior face 41 and coincident with the direction of the carriage member 32 displacement relative to the rail 34. Other combinations of the number of carriage members and fasteners used to comprise a linear motion carriage assembly are envisioned. Other frame materials are also envisioned, such as nylon, or metals such as aluminum.

The frame 40 contains a number of coupling aperture elements 42, 43 & 44 to secure carriage members 32 adjacent and opposite, where present. In one embodiment, the carriage frame 40 includes two sets of through-hole normal coupling apertures 43, 44 and one set of through-hole lateral coupling apertures 42. The normal coupling apertures 43 & 44 are generally perpendicular to the outside face 41 of the frame 40, while the lateral coupling apertures 42 are generally parallel to the face 41. In one embodiment, each normal coupling aperture 44 includes a threaded brass insert fastener nut 46 that is molded into the acrylonitrile butadiene styrene plastic frame 40. Other combinations of elements to secure the carriage members together are envisioned, such as with fewer through-hole coupling apertures or apertures with external non-captured threaded nuts. Furthermore, the lateral coupling apertures 42 can be fabricated using sliding shut-offs in the injection molding tool, which results in lateral coupling apertures 42 with partial voids surrounding various sections.

The carriage members 32 adjacent and opposite are fastened by a long threaded coupling fastener 45 passing through the normal coupling aperture 43 of the first carriage member 32, then through the lateral coupling aperture 42 of the second carriage member 32 arranged head-to-toe to the first carriage member 32, and then through the normal coupling aperture 44 and fastener nut 46 insert in the third carriage member 32 again arranges head-to-toe to the second carriage member 32. Having the two fastener nuts 46 located on the same side of the frame 40 allows for the carriage member 32 to be fastened to an opposing carriage member with only two threaded coupling fasteners 45 without further requiring separate threaded fastener nuts. Other embodiments of the carriage member are envisioned, such as those with a differing number or arrangement of apertures. Other embodiments of the fastening arrangement are also envisioned, such as clips to fasten adjacent carriage members.

Figure 4:
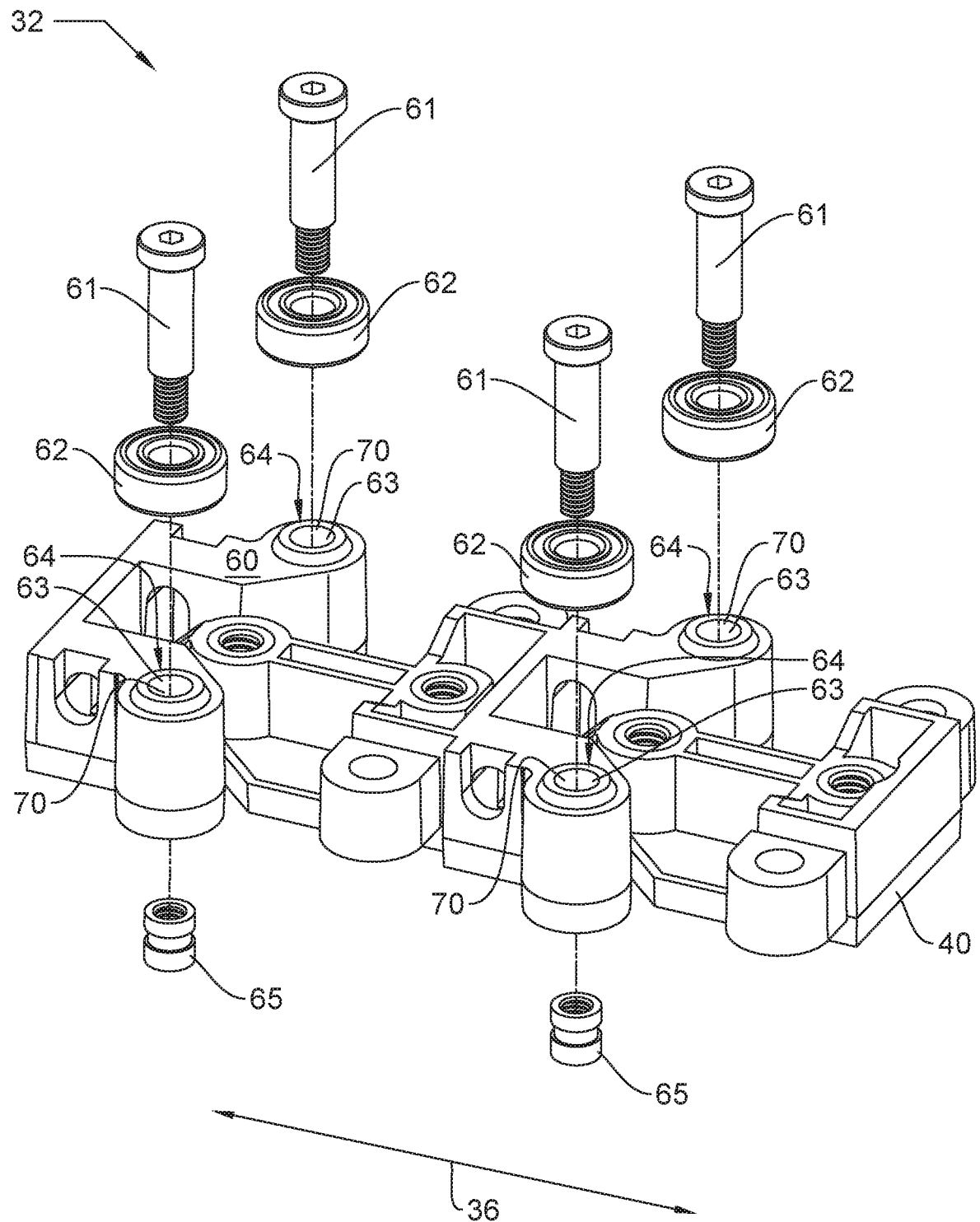
FIG. 4 is an underside isometric partially exploded view of a carriage member in one embodiment.

FIG. 4 shows an underside exploded view of the carriage member 32 of FIG. 2. In one embodiment the carriage member 32 comprises a frame 40 with a plurality of bearing apertures 70, a plurality of fasteners 61, and a plurality of radial cartridge bearings 62. In one embodiment there are four bearings 62, and four mating fasteners 61. In the embodiment shown, the threaded fasteners 61 are shoulder bolts.

In one embodiment, the bearing apertures 70 of the frame 40 includes a plurality of through-holes 63 that are generally perpendicular to the frame inner face 60, to receive the plurality of threaded fasteners 61. In one embodiment, the frame 40 further comprises captured threaded fastener nuts 65 to receive the external threaded fasteners 61, located at the terminus of the through-holes 63. In one embodiment, the threaded fastener nuts 65 are brass inserts. In one embodiment, the frame includes a raised face 64 as a contact face for the bearing 62.

In one embodiment, fastening the bearings 62 to the frame 40 therefore comprises inserting the bearing 62 onto the shoulder bolt 61, then passing the shoulder bolt 61 into the through-hole 63 and then threading the fastener 61 into the receiving captured threaded fastener nut 65, with the inner race of the bearing 62 in compression with the face 64 of the frame 40. Other methods to fasten and locate the bearings 62 on the frame 40 are envisioned, such as a captured mold-in insert that contains a smooth shaft similar to that of the shoulder on the shoulder bolt 61, with a nut securing the bearing to threads at the end of the shaft. Another fastening method envisioned is a simple bolt and nut arrangement. Other embodiments of the radial cartridge bearing 62 are also envisioned, such as a bearing further including a plastic over-mold on the outer race to provide a plastic contact surface.

Figure 5:
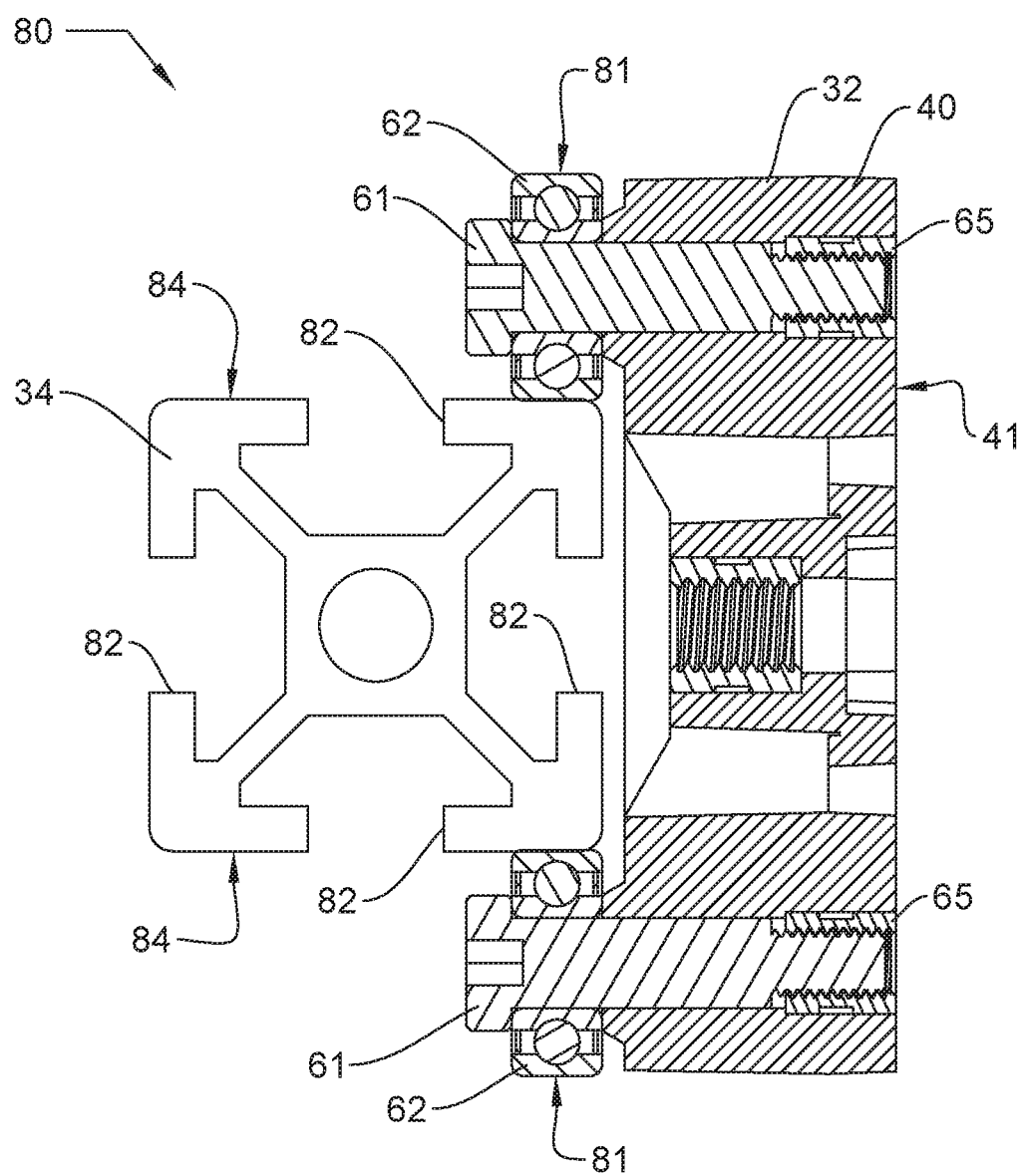
FIG. 5 is an end section view of the linear motion carriage assembly in one embodiment.

FIG. 5 shows an end section view of an embodiment of the linear motion carriage assembly 80 wherein the assembly contains only one carriage member 32. The linear motion carriage assembly 80 is configured for use with a rail 34 with generally parallel opposing faces 84 forming a rectangular cross-section. The carriage member 32 comprises a frame 40, radial cartridge bearings 62, and fasteners 61, configured to be displaceable along the rail 34. In one embodiment, the outer race faces 81 of the radial cartridge bearings 62 contact the rail 34 on the generally parallel opposing faces 84, with the contact surface at the intersecting corner faces of the rail 34, to aid in controlling against rotation of the carriage member 32 about the rail 34.

The rail 34 has recesses 82 in the outer faces 84 that are common for aluminum extrusion of the Bosch Rexroth type, often times referred to as T-slots. The outer opposing faces 84 of the rail 34 can be slightly non-parallel, with the adjacent faces forming an angle that is not square. This is the case with extrusions by manufacturer 80/20® Inc., as they have exterior extrusion faces 84 at negative two degrees from the face plane, forming an acute angle with the adjacent side of approximately 86 degrees. As previously noted, a plurality of other extrusion profiles are also suitable and envisioned provided they have generally parallel opposing faces.

As a result of the bearing contact faces 81 being located near the edges of the rail 34, both the rail recesses 82 and non-parallel opposing faces 84 are accounted for in the design of the linear motion carriage assembly 30. Further voids in the rail 34 at the bearing contact face 81 are also accounted for, as the radial cartridge bearings 62 have large contact faces 81.

Figure 6:
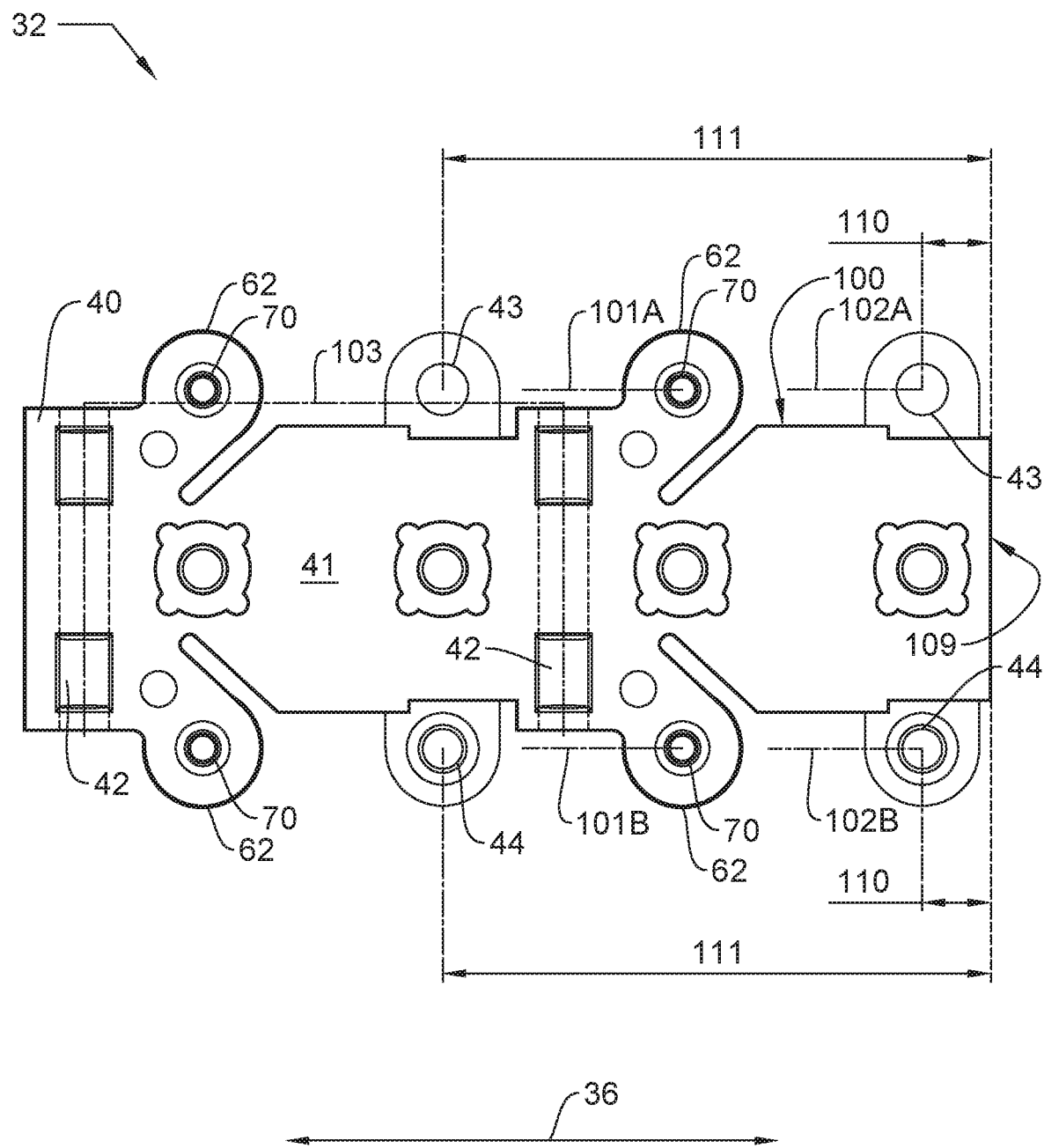
FIG. 6 is a top view of the exterior face of the carriage member frame in one embodiment.

FIG. 6 shows a top view of an embodiment of the carriage member 32. The carriage member 32 includes two rows 101A & 101B of bearing apertures 70, each row parallel a side face 100 of the frame 40, with the bearing apertures perpendicular to the exterior face 41 of the frame 40. In this embodiment, each bearing aperture row 101A, 101B contains two bearings apertures 70, with each bearing 62 located opposite a corresponding bearing 62 of the other row. In one embodiment, the carriage member 32 also includes a first row 102A of normal coupling apertures 43 and a second row 102B of normal coupling apertures 44, with the rows 102A & 102B located normal to the face 100 of the frame 40, with the normal coupling apertures 43 & 44 located perpendicular the the face 41 of the frame 40. The first normal coupling aperture 43, 44 in each row is spaced a similar distance 110 from an end 109 of the carriage frame 40, and the second normal coupling aperture 43, 44 in each row is spaced a similar distance 111 from the end 109. Furthermore, the frame also includes a row 103 of lateral coupling apertures 42, with the row located parallel the outer face 41 of the frame 40 and the lateral coupling apertures 42 located perpendicular to the face 100 of the frame 40.

In this embodiment, there are an equal number of normal coupling apertures 43, normal coupling apertures 44, and lateral coupling apertures 42. Having equal number of apertures 42, 43 & 44 along with equal spacing of all elements in all rows 102A, 102B and 103 also allows adjacent carriage frames 40 to be mounted in a heat-to-toe arrangement to achieve the most compact assembly. Other embodiments are envisioned, such as where the normal coupling aperture rows 102A & 102B and the lateral coupling aperture row 103 all contain only one aperture element each.

Figure 7A:
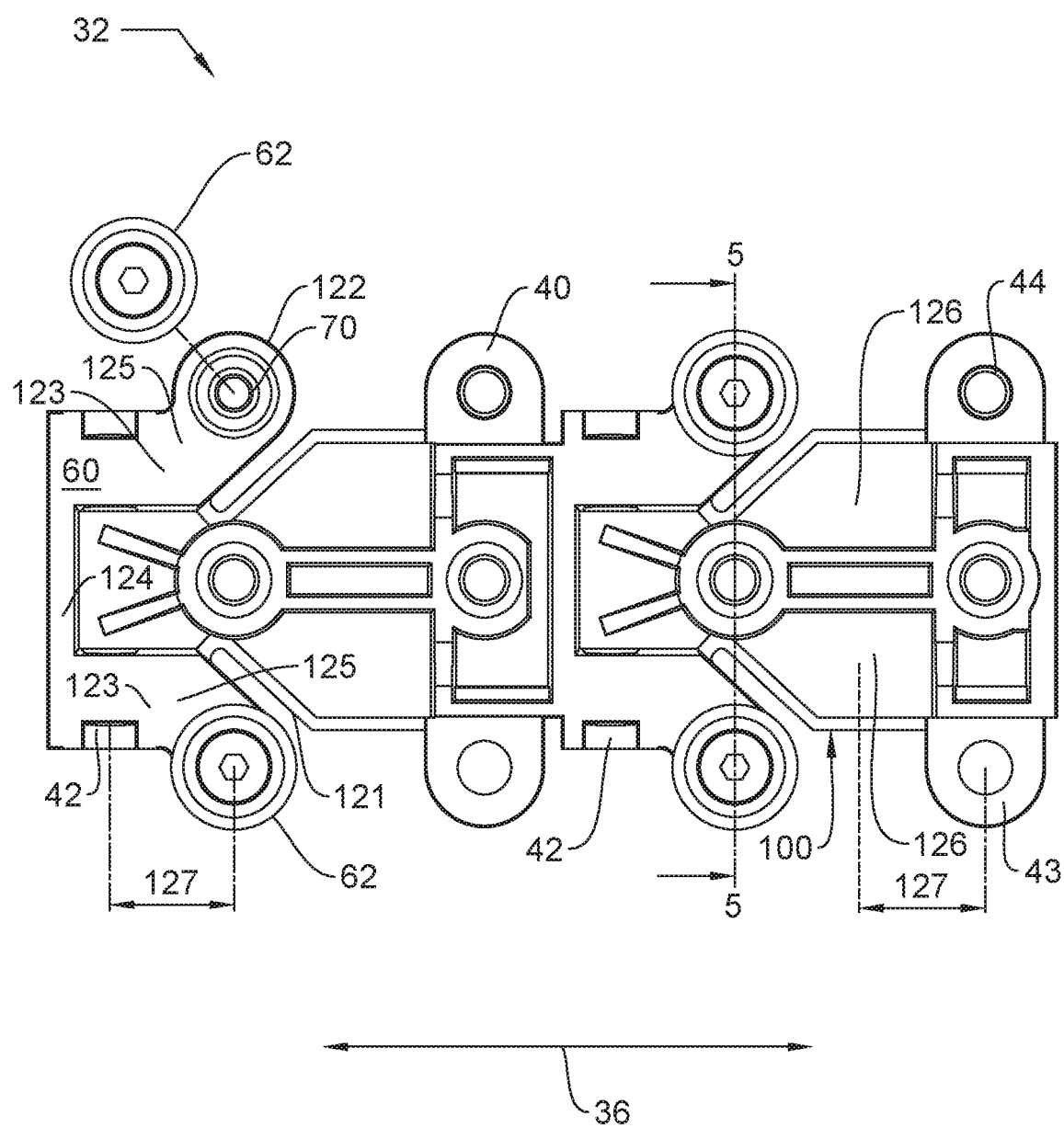
FIG. 7A is a partially exploded bottom view of the interior face of the carriage member in one embodiment.

FIG. 7A shows a partially exploded bottom view of an embodiment of the carriage member 32. In one embodiment the frame 40 includes a bearing fastener receptacle 122 which comprises a generally cylindrical portion 126 of the frame 40 surrounding the bearing aperture 70. In one embodiment, the bearing fastener receptacle 122 is at the end of a cantilevered arm 123 configured to be displaceable generally perpendicular to the side face 100 of the rail 34. The cantilever 123 forms a generally L shape when viewed from the bottom looking at the interior frame face 60.

In one embodiment, the frame 40 includes bearing clearance cavities 126 that extend from the inside face 60 into the frame 40 adjacent the normal coupling apertures 43 & 44. In one embodiment, the bearing apertures 70 are spaced a distance 127 from the lateral coupling apertures 42, which is a similar distance from the normal coupling apertures 43 & 44 to a portion of the bearing clearance cavities 126. The bearing clearance cavities 126 are of sufficient size in depth and width to provide clearance for the bearing and bearing fastener of a mating carriage member 32 when used. Other embodiments for the bearing clearance cavities 126 are envisioned, such as cavities that extend through the frame to form complete material voids.

In one embodiment, the cantilevered arm 123 comprises a void 121 in the frame 40 abutting the bearing fastener receptacle 122, a very stiff thick region 125 on the most outward frame 40 portion, and a thin connecting rib 124 in the frame 40 designed to flex, allowing the cantilevered arm 123 to flex with relatively low force, which permits the bearing fastener receptacle 122 and bearing 62 to accommodate varying distances between the corresponding opposing bearing 62 with minimal change in the pre-load force of the radial cartridge bearing 62. In one embodiment the cantilever further includes the lateral coupling apertures 42 placed in-board in the cantilevered arm 123 which can aid in limiting of the travel of the cantilevered arm 123 when a fastener is secured in the lateral coupling aperture 42.

Other embodiments of the cantilever composition are envisioned, with variations in the sections of the frame 40 cantilever that are designed to provide the elastic deformation, such as cantilevered arms that lack the connecting rib 124. Another embodiment envisioned includes a second connecting rib 124 to provide a stiffer assembly. The spring force of the cantilevered arm 123 is affected by a number of factors, including distance of the fastener receptacle 122 to the connecting rib 124, the length of the void 121, and the stiffness of the thick region 125.

Figure 7B:
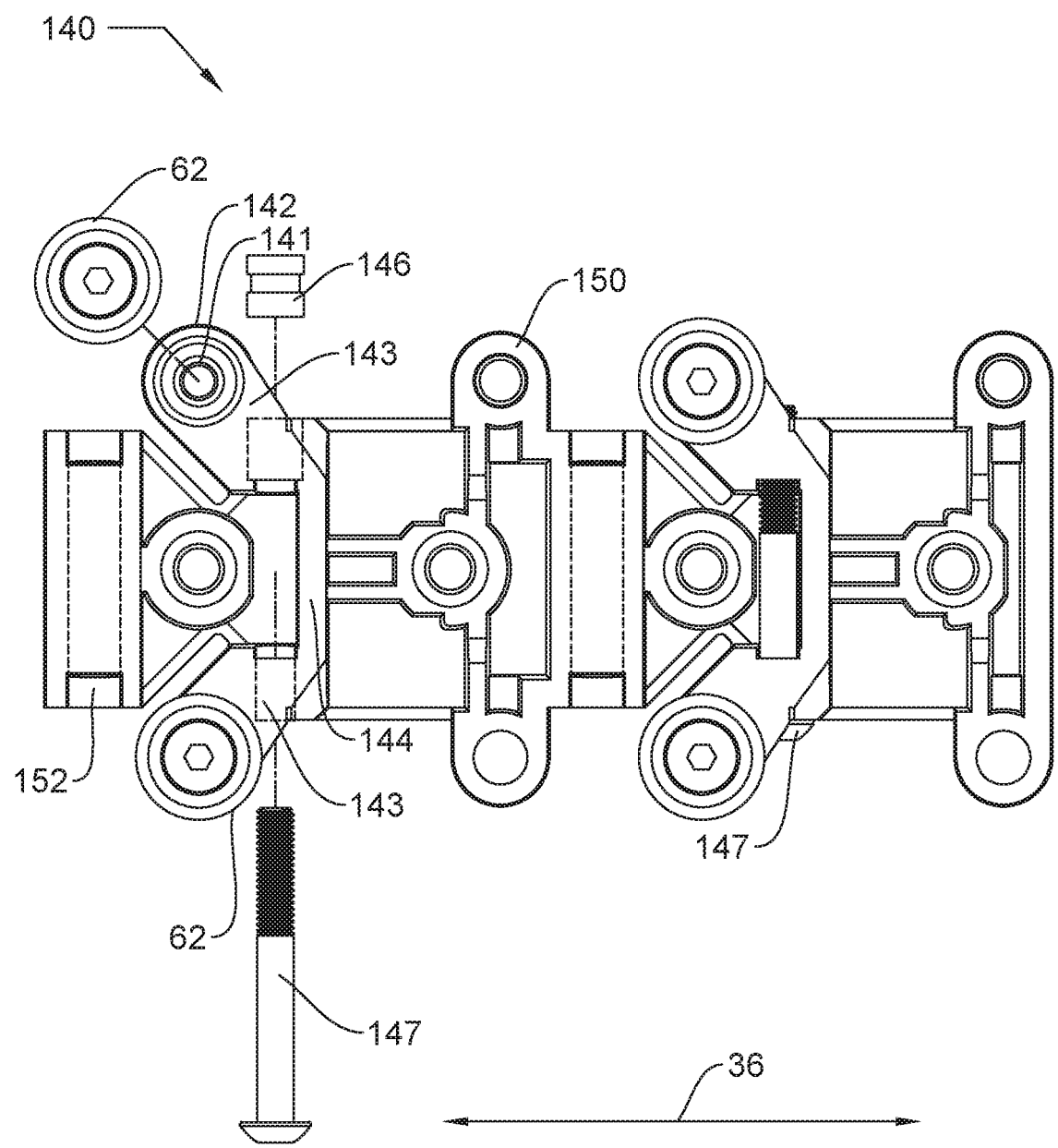
FIG. 7B is a partially exploded bottom view of an interior face of a carriage member in another embodiment.

FIG. 7B shows a partially exploded bottom view of a carriage member 140 in another embodiment. In one embodiment, the frame 150 includes a plurality of bearing fastener receptacles 142 surrounding bearing apertures 141. In one embodiment, the bearing fastener receptacles 142 are connected to the frame 150 by cantilevered arms 143 and a connecting rib 144. In one embodiment, the cantilevered arms have an embedded fastener nut 146 through which a threaded fastener bolt 147 connects, with the axes of the fasteners located between the bearing receptacles 142 and connecting rib 144. The cantilevered arms 143 are configured independently from the lateral coupling apertures 152 used to connect adjacent abutting carriage members 160.

Having the cantilevered arms 143 independent allows for adjustment to preload of the radial cartridge bearing 62 to be made on individual carriage members 140 prior to assembly with mating carriage members 140. This aids in carefully setting and measuring the preload of the radial cartridge bearings 62. Tension on the radial cartridge bearings 62 is set by the threaded fastener bolt 147 compressing opposing cantilevered arms 143 while threading into the embedded nut 146. Other embodiments of independent cantilevered arms are envisioned, such as frames with one cantilevered arm 143 per set of two bearings, with the other bearing fastener receptacle 142 fixed.

Figure 7C:
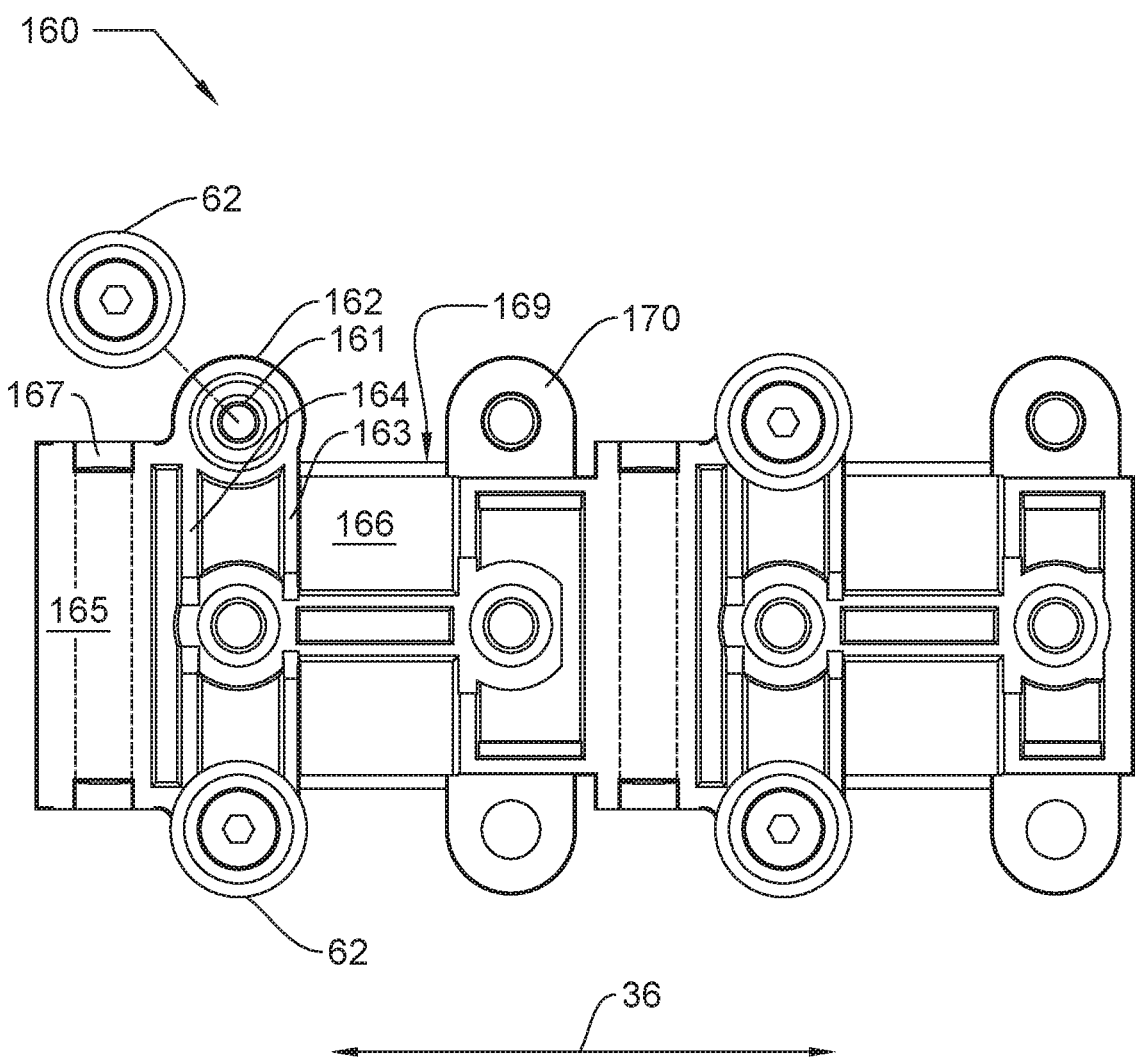
FIG. 7C is a partially exploded bottom view of an interior face of a carriage member in another embodiment.

FIG. 7C shows a partially exploded bottom view of a carriage member 160 in another embodiment. In one embodiment, the frame 170 includes a plurality of bearing fastener receptacles 162, and a side face 169 parallel the direction of travel 36. In one embodiment, the frame 170 includes two ribs 163 & 164 extending from the bearing fastener receptacle 162 inwards in the frame 170 perpendicular to the side face 169, with both ribs generally parallel each other. The ribs 163 & 164 extend from the interior frame face 165 to the inner most interior face 166 of the frame 170. The ribs 163 & 164 provide support for the bearing fastener receptacles 162 by limiting the elastic flex in the frame 170.

The ribs 163 & 164 allow the bearing 62 to be displaceable generally perpendicular to the side face 161 with an acceptable increase in bearing radial preload, while still providing a high load capacity of the carriage member 160. The ribs 163 & 164 act independently from surrounding material of the lateral coupling aperture 167, further allowing the fastening of adjacent carriage members 160 without affecting bearing preload. Other embodiments are envisioned, including an embodiment in which a plurality of ribs are arranged at varying angles, and in another, a plurality of voids in the frame 170 that still permit minor movement of the bearing fastener receptacle 162.

Figure 8:
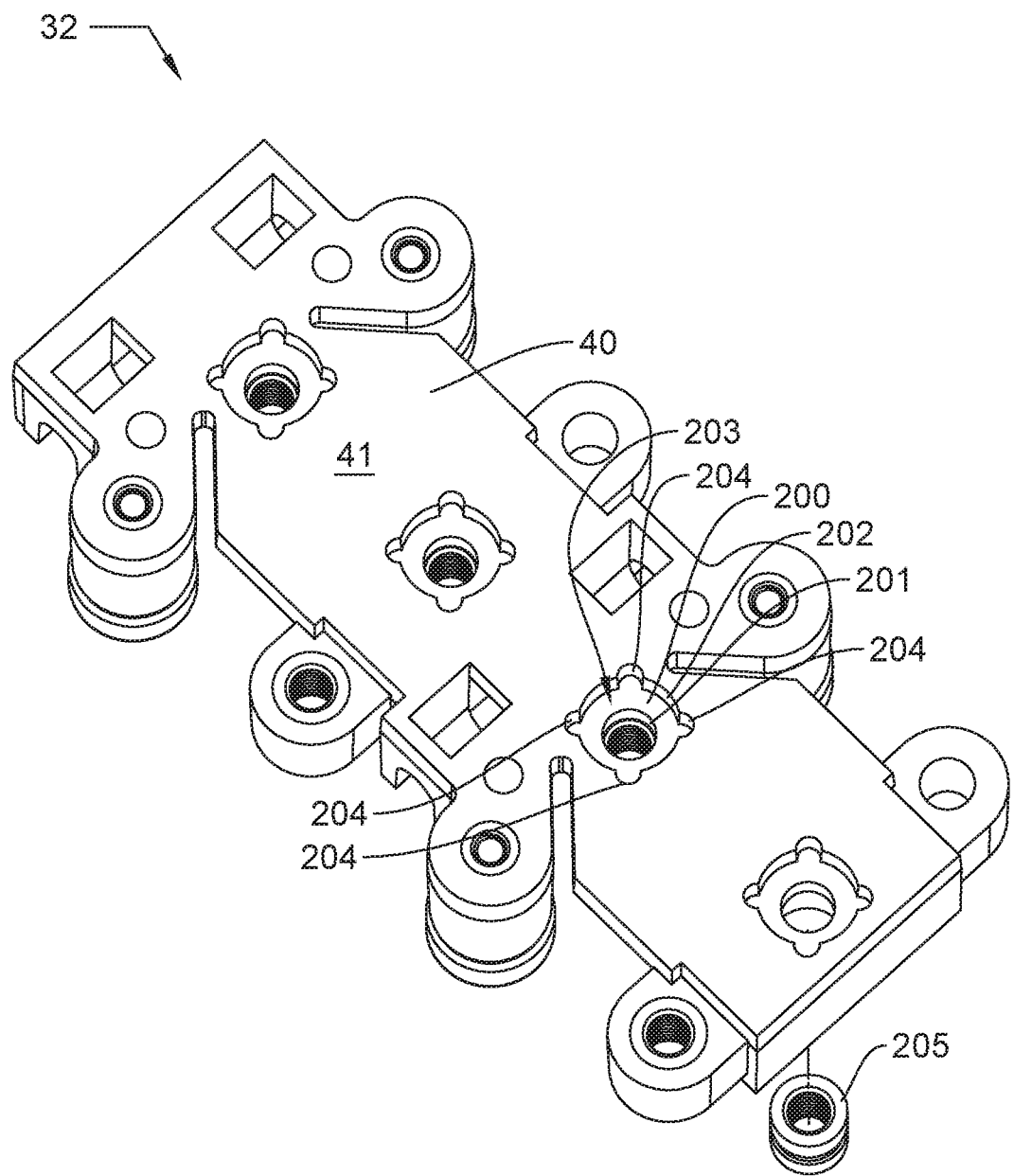
FIG. 8 is a partially exploded isometric view of the carriage member in one embodiment.

FIG. 8 shows a partially exploded isometric view of the carriage member 32. In the embodiment shown, the frame 40 of the carriage member 32 includes a plurality of mounting apertures 200 to allow mounting external components to the carriage member 32. The mounting apertures 200 have an interior hole 201 with an axis normal to the exterior face 41 of the frame 40. In one embodiment, the apertures 200 comprise a through-hole 201, a second hole 202 of larger diameter than the through-hole 201 with both holes 201 & 202 coaxial, extending to a recessed face 203, and locating ears 204 located radially about the through-hole 201 extending from the exterior face 41 of the frame 40 to the recessed face 203. In one embodiment, each aperture further includes a captured thread brass insert fastener 205 terminating at the end of the through-hole 201 near the interior face of the frame 40. Other fastening arrangements for external components are also envisioned, including but not limited to non-captured threaded nuts used in conjunction with threaded bolts.

In one embodiment, there are four locating ears 204 spaced evenly every 90 degrees. The recessed face 203 is configured to aid attachment of an external component to the frame 40 by a mating feature that is a Boolean operation of the negative feature of the aperture 200 of the frame 40. The ears 204 aid in limiting the rotation about the through-hole 201 if the external component utilizes only one aperture 200 in the frame 40 to mount to, working much the same as screwdriver bit limits rotation in the fastener it is driving. Other embodiments for aperture locating features are envisioned, such as positive locating ears 204 with positive surfaces, as opposed to negative or indentions, in the outer recessed face 203.

Figure 9A:
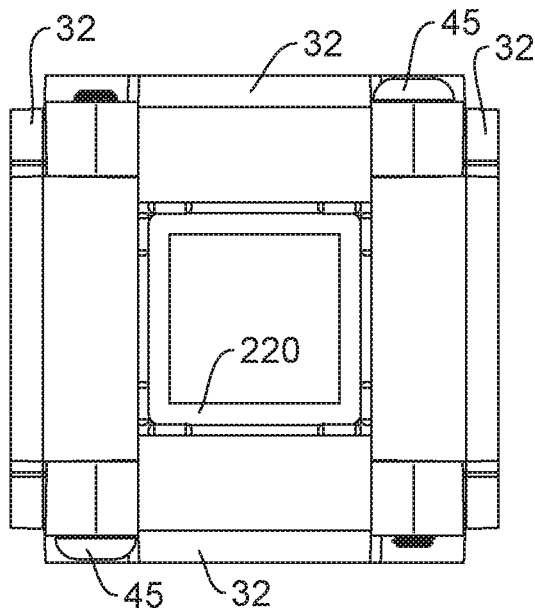
FIGS. 9A-9D are end views of the linear motion carriage assembly showing a plurality of embodiments.
Figure 9B:
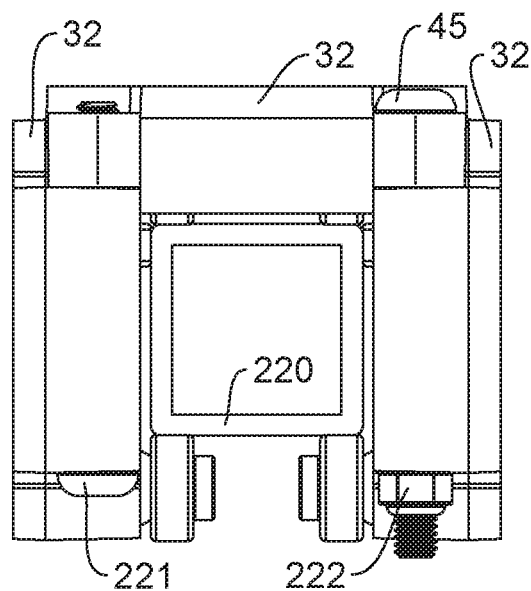
Figure 9C:
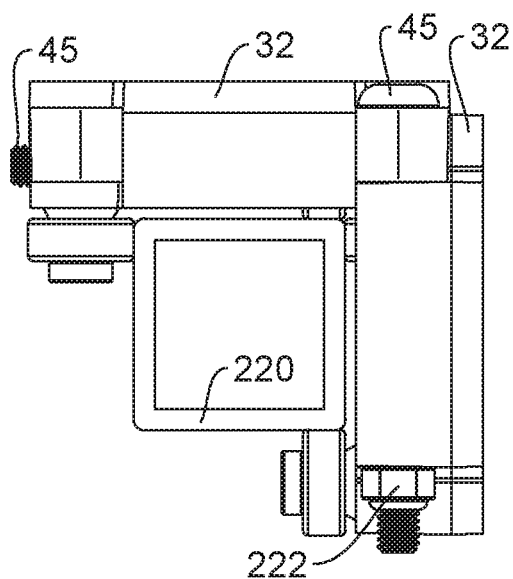
Figure 9D:
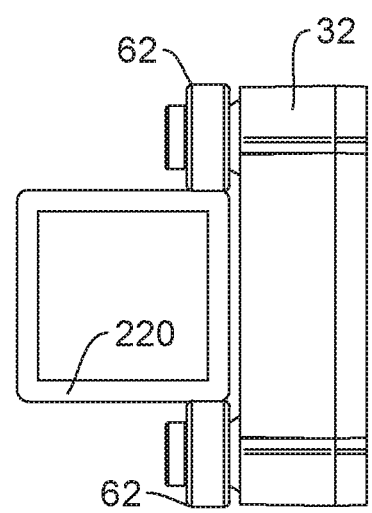

FIGS. 9A-9D show end views of linear motion carriage assemblies according to respective embodiments. In the embodiment of FIG. 9A, the linear bearing carriage assembly comprises four carriage members 32 that are mounted on a rail 220, with the carriage members 32 joined by fasteners 45. In the embodiment of FIG. 9B, the carriage assembly comprises three carriage members 32, with opposing carriage members joined by fasteners 45, and adjacent carriage members joined by shorter fasteners 221 or longer fasteners 45 secured by threaded fastener nuts 222. In the embodiment of FIG. 9C, the carriage assembly comprises two adjacent carriage members 32 joined together by shorter fasteners 221. In the embodiment of FIG. 9D, the carriage assembly comprises only one carriage member 32. All the above embodiments show the modularity of the carriage members. Further embodiments are envisioned when split carriage members containing only two bearings 62 are utilized.

Figure 10:
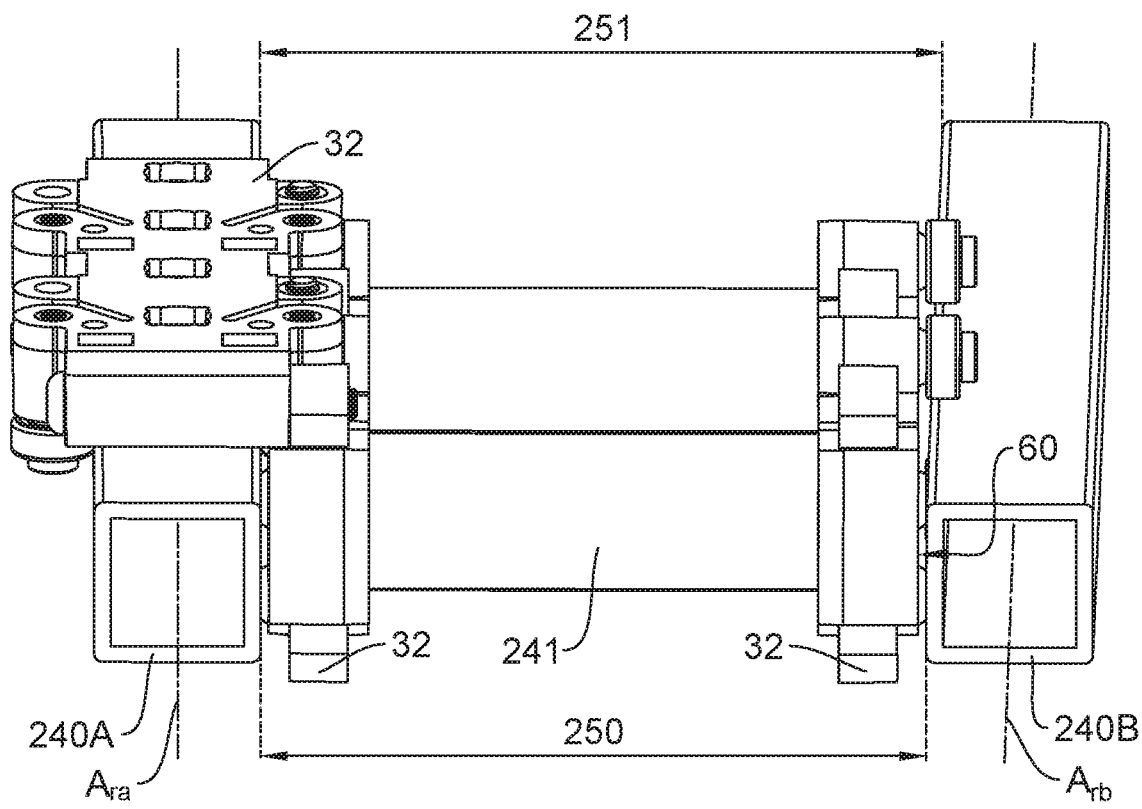
FIG. 10 is an isometric end view of two carriage assemblies linked together on separate generally parallel rails in one embodiment.

FIG. 10 shows an isometric end view of multiple carriage assemblies on separate rails 240A & 240B with generally though not absolutely parallel axes Ara & Arb. In one embodiment, two carriage members 32 are configured on one rail 240A, while one carriage member 32 is configured on a second rail 240B, joined by a coupling structure 241. In one embodiment, the distance 250 separating the rails at one end is slightly less than the distance 251 separating the rails at the other end.

The three carriage members 32 are used individually in this embodiment to control all desired degrees of movement freedom with the exception of the desired direction of travel, while ensuring the moving assembly does not bind on either rail 240A or 240B. This is accomplished by controlling for only sliding movement along the first rail 240A in the direction of travel, while allowing movement of the interior face 60 of the carriage member 32 away from the second rail 220B as the assembly is moved along the rails 240A & 240B. Other combinations of carriage members are envisioned, such as four carriage members 32 on the first rail 240A in conjunction with one carriage member 32 on the second rail 240B.

Figure 11:
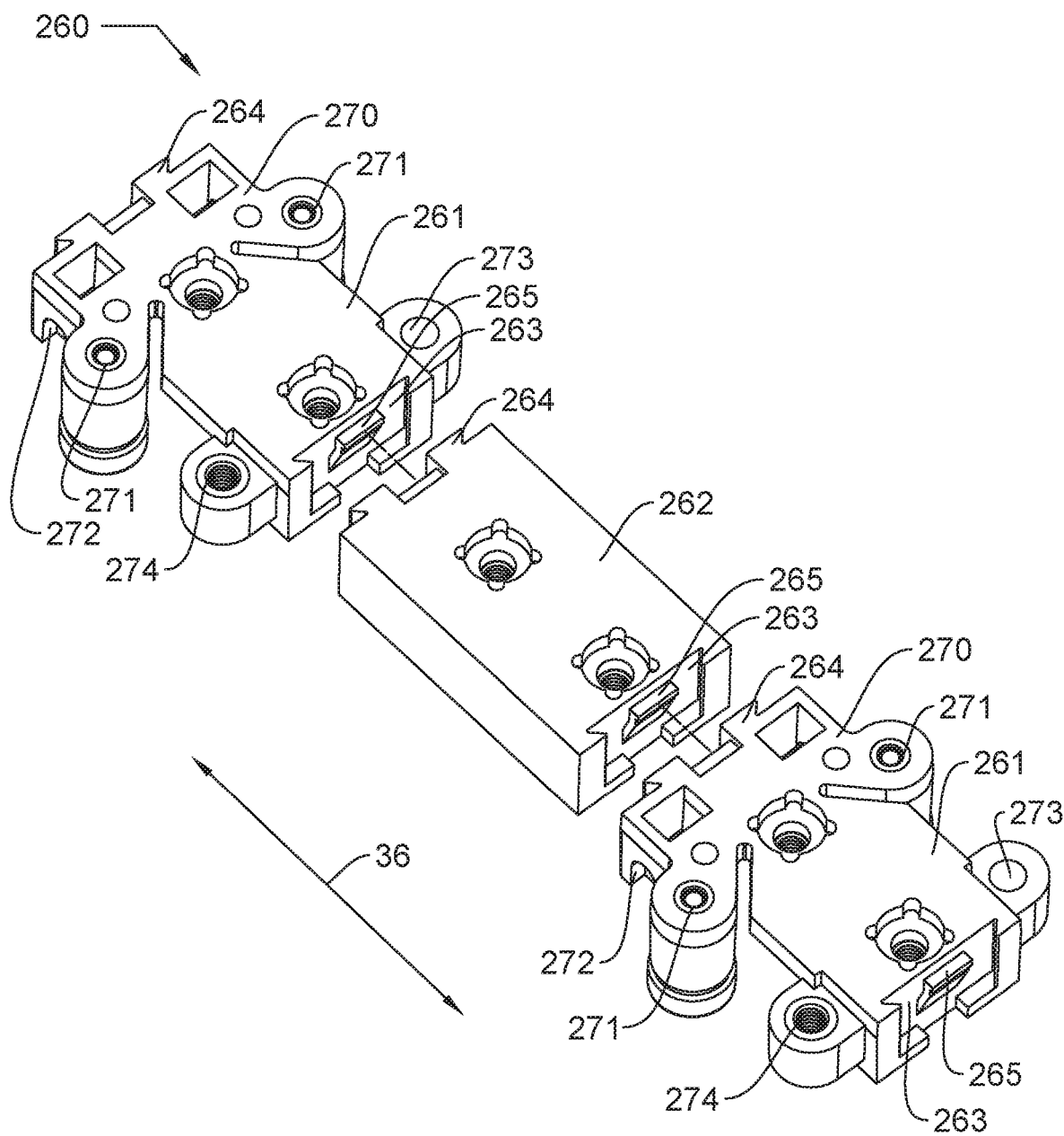
FIG. 11 is a partially exploded isometric view of a carriage assembly in another embodiment.

FIG. 11 shows a partially exploded isometric view of a carriage assembly in another embodiment. In one embodiment, the carriage assembly 260 is comprised of two carriage members 261 and a carriage member spacer 262. The carriage members 261 comprise one through-hole normal coupling aperture 273, one threaded normal coupling aperture 274, one lateral coupling aperture 272, and two bearing apertures 271. In one embodiment, both the carriage members 261 and the carriage coupling spacer 262 include a salient dovetail coupling 264 at one end, and a matching dovetail receptacle 263 at the opposing end. In one embodiment, both the carriage members 261 and the carriage member spacer 262 further include a locking clip 265 in the dovetail receptacle 263.

Having two separate modular carriage members 261 allows for multiple options for the length of the carriage assembly 260 with the use a varying lengths of carriage member spacers 262. Carriage assemblies that have a greater length between bearing apertures 271 provide a stiffer assembly when the external force on the carriage assembly is acting on a lever arm parallel to the direction of travel 36. Other embodiments of the carriage assembly 260 are envisioned, such as those with both carriage members 261 joined together, and carriage member spacer 262 omitted. Other embodiments for joining the carriage members 261, and carriage member spacers 262 when used, are envisioned such a coupling aperture.

The reader will see that the linear motion carriage assemblies of the embodiments described above include numerous advantages and novel features over current prior art, such as but not limited to adjustability of the bearing contact distances to accommodate rails of varying width with minimal increase in bearing pre-load, normal coupling apertures and lateral coupling apertures to fasten adjacent carriages members at abutting right angles with minimal fasteners, a plurality of mounting apertures to mount accessories to the carriage members by apertures which contain anti-clocking elements and molded-in inserts, and the option to use a singular carriage member or multiple carriage members to allow various degrees of freedom in the assembly in the event of using multiple linear motion carriage assemblies on separate rails in generally parallel configurations.

All dimensions used in the above figure descriptions are exemplary, with other suitable dimensions also envisioned.

The above description of the linear motion carriage assembly contains specificities, which should not be construed as limitation to the scope of the embodiments. The specificities are exemplary descriptions of embodiments, with other suitable embodiments also envisioned. Therefore, the appended claims and not the above description of figures should be the arbiter of the scope.

What is claimed is:

1. A carriage assembly comprising a first carriage frame, the first carriage frame having:
   a mounting face, the mounting face defining a carriage plane,
   a first bearing aperture row having at least one bearing aperture extending in the carriage frame substantially normal to the carriage plane and opening to a face of the carriage frame opposite the mounting face and arranged adjacent to a first side of the first carriage frame,
   a second bearing aperture row having at least one bearing aperture extending in the carriage frame substantially normal to the carriage plane and opening to a face of the carriage frame opposite the mounting face and arranged adjacent to a second side of the carriage frame opposite the first side,
   a first normal coupling aperture row having at least one normal coupling aperture extending through the carriage frame substantially normal to the carriage plane and arranged adjacent to the first side of the first carriage frame, with a coupling aperture at the end of the first normal coupling aperture row spaced a first distance from a first end of the first carriage frame,
   a second normal coupling aperture row having at least one normal coupling aperture extending through the carriage frame substantially normal to the carriage plane and arranged adjacent to the second side of the first carriage frame with a coupling aperture at the end of the second normal coupling aperture row spaced the first distance from the first end of the first carriage frame,
  a lateral coupling aperture row arranged adjacent the mounting face, having at least one lateral coupling aperture extending transversely through the first carriage frame between the first and second sides and parallel to the carriage plane,
  a first bearing clearance cavity row having at least one bearing clearance cavity extending in the carriage frame and opening to a face of the carriage frame opposite the mounting face and arranged adjacent to the first side of the first carriage frame,
  a second bearing clearance cavity row having at least one bearing clearance cavity extending in the carriage frame and opening to a face of the carriage frame opposite the mounting face and arranged adjacent to the second side of the carriage frame; and,
  a plurality of mounting apertures extending in the carriage frame and opening on the mounting face.

2. The carriage assembly of claim 1, further comprising:
  a first radial cartridge bearing, axially aligned with a first one of the plurality of bearing apertures and coupled to the first carriage frame by a bearing fastener extending through the first radial cartridge bearing and into the first one of the plurality of bearing apertures; and
  a second radial cartridge bearing, axially aligned with a second one of the plurality of bearing apertures and coupled to the first carriage frame by a fastener extending through the second radial cartridge bearing and into the second one of the plurality of bearing apertures.

3. The carriage assembly of claim 2, wherein the plurality of bearing apertures further include a threaded insert terminating at the mounting face.

4. The carriage assembly of claim 1, wherein each normal coupling aperture of the first normal coupling aperture row is configured to slidably receive a coupling fastener, and each normal coupling aperture of the second normal coupling aperture row includes a threaded insert.

5. The carriage assembly of claim 1, further comprising a second carriage frame, substantially identical to the first carriage frame, and positioned with a mounting plane of the second carriage frame lying substantially perpendicular to the mounting plane of the first carriage frame with a respective coupling fastener extending through each normal coupling aperture of the first normal coupling aperture row of the first carriage frame and through a corresponding lateral coupling aperture of the second carriage frame.

6. The carriage assembly of claim 5, further comprising a third carriage frame, substantially identical to the first and second carriage frames, positioned with a mounting plane of the third carriage frame lying substantially perpendicular to the mounting plane of the second carriage frame and parallel to the mounting plane of the first carriage frame, and with the respective coupling fastener that extends through each normal coupling aperture of the first normal coupling aperture row of the first carriage frame and through the corresponding lateral coupling aperture of the second carriage frame also extending into a corresponding normal coupling aperture of one the second normal coupling aperture row of the third carriage frame.

7. The carriage assembly of claim 5, wherein the first and second carriage frames are substantially identical, except that a distance between the first normal coupling aperture row and the second normal coupling aperture row of the first carriage frame is greater than a distance between the first normal coupling aperture row and the second normal coupling aperture row of the second carriage frame.

8. The carriage assembly of claim 1, wherein a respective portion of the first carriage frame that includes each of the plurality of bearing apertures is configured to be resiliently displaced relative to others of the plurality of bearing apertures.

9. The carriage assembly of claim 1, wherein the first carriage frame further comprises:
  a first plurality of cantilevered arms extending from the carriage frame on the first side of the carriage frame, with a corresponding one of the plurality of bearing apertures formed therein, each of the first plurality of cantilevered arms being configured to be displaced, relative to others of the first plurality of cantilevered arms, by elastic frame deflection; and,
  a second plurality of cantilevered arms extending from the carriage frame on the second side of the carriage frame, with a corresponding one of the plurality of bearing apertures formed therein, each of the second plurality of cantilevered arms being configured to be displaced, relative to others of the second plurality of cantilevered arms, by elastic frame deflection.

10. The carriage assembly of claim 1, wherein each mounting aperture includes a pass through hole, an exterior recess of larger diameter than the pass through hole, and a plurality of exterior recessed locating ears spaced radially around the inner surface of the exterior diameter recess.

11. The carriage assembly of claim 1, wherein the mounting apertures further include a threaded insert terminating at a face of the carriage frame opposite the mounting face.

12. The carriage assembly of claim 1, wherein the first carriage frame is formed from acrylonitrile butadiene styrene plastic.

13. The carriage assembly of claim 1, wherein the frame further includes a salient dovetail coupling extending from the exterior face of the frame on the first end, and a dovetail receptacle on a second end of the frame, with the salient dovetail coupling being similar in size to the dovetail receptacle.

14. The carriage assembly of claim 13, further including a second carriage member and a carriage member spacer, said spacer including a dovetail coupling and dovetail receptacle, with the dovetail coupling of the carriage member spacer slidably engaged in the dovetail receptacle of the first carriage member, and the second carriage member dovetail coupling slidably engaged in the dovetail receptacle of the carriage member spacer.

15. A carriage assembly comprising a first carriage frame, the first carriage frame having:
  a mounting face, the mounting face defining a carriage plane,
  a first bearing aperture row having at least one bearing aperture extending in the carriage frame substantially normal to the carriage plane and opening to a face of the carriage frame opposite the mounting face and arranged adjacent to a first side of the first carriage frame,
  a second bearing aperture row having at least one bearing aperture extending in the carriage frame substantially normal to the carriage plane and opening to a face of the carriage frame opposite the mounting face and arranged adjacent to a second side of the carriage frame opposite the first side,
  a plurality of cantilevered arms, each of the cantilevered arms with a corresponding one of the plurality of the bearing apertures formed therein, extending from the carriage frame on the corresponding side of the carriage frame, each of the cantilevered arms being configured to be displaceable by elastic frame deflection generally relative to corresponding side, a first normal coupling aperture row having at least one normal coupling aperture extending through the carriage frame substantially normal to the carriage plane and arranged adjacent to the first side of the first carriage frame, a second normal coupling aperture row having at least one normal coupling aperture extending through the carriage frame substantially normal to the carriage plane and arranged adjacent the second side of the first carriage frame, a lateral coupling aperture row arranged adjacent the mounting face, having at least one lateral coupling aperture extending transversely through the first carriage frame between the first and second sides and parallel to the carriage plane; and, a plurality of mounting apertures extending in the carriage frame and opening on the mounting face.

16. The carriage assembly of claim 15, further comprising:

a first radial cartridge bearing, axially aligned with a first one of the plurality of bearing apertures and coupled to the first carriage frame by a bearing fastener extending through the first radial cartridge bearing and into the first one of the plurality of bearing apertures; and, a second radial cartridge bearing, axially aligned with a second one of the plurality of bearing apertures and coupled to the first carriage frame by a fastener extending through the second radial cartridge bearing and into the second one of the plurality of bearing apertures.

17. The carriage assembly of claim 16, wherein the plurality of bearing apertures further include a threaded insert terminating at the mounting face.

18. The carriage assembly of claim 15, wherein each normal coupling aperture of the first normal coupling aperture row is configured to slidably receive a coupling fastener, and each normal coupling aperture of the second normal coupling aperture row includes a threaded insert.

19. The carriage assembly of claim 15, wherein each mounting aperture includes a pass through hole, an exterior recess of larger diameter than the pass through hole, and a plurality of exterior recessed locating ears spaced radially around the inner surface of the exterior diameter recess.

20. A linear motion apparatus, comprising:
a rail, having a generally rectangular profile; and,
a carriage assembly, comprising:
  a first carriage member, said member including:
    a carriage frame, said frame comprising:
      a mounting face, the mounting face defining a carriage plane,
      a first bearing aperture row having at least one bearing aperture extending in the carriage frame substantially normal to the carriage plane and opening to a face of the carriage frame opposite the mounting face and arranged adjacent to a first side of the first carriage frame,
      a second bearing aperture row having at least one bearing aperture extending in the carriage frame substantially normal to the carriage plane and opening to a face of the carriage frame opposite the mounting face and arranged adjacent to a second side of the carriage frame opposite the first side,
      a first normal coupling aperture row having at least one normal coupling aperture extending through the carriage frame substantially normal to the carriage plane and arranged adjacent to the first side of the first carriage frame the second side of the carriage frame,
      a second normal coupling aperture row having at least one normal coupling aperture extending through the carriage frame substantially normal to the carriage plane and arranged adjacent the second side of the first carriage frame,
      a lateral coupling aperture row arranged adjacent the mounting face, having at least one lateral coupling aperture extending transversely through the first carriage frame between the first and second sides and parallel to the carriage plane; and,
      a plurality of mounting apertures extending in the carriage frame and opening on the mounting face,
    a plurality of radial cartridge bearings, each of said bearings located adjacent a respective bearing aperture, said bearings contacting two generally parallel opposing faces of the extrusion; and,
    a plurality of threaded fasteners, each of said fasteners securing a respective bearing to a respective bearing aperture.

21. The linear motion apparatus of claim 20, wherein the carriage assembly further comprises a second, third, and fourth carriage member substantially similar to the first carriage member.

22. The linear motion apparatus of claim 21, wherein the carriage assembly further includes a respective threaded coupling fastener extending through each normal coupling aperture of the first normal coupling aperture row of the first carriage frame, through a corresponding one of the lateral coupling apertures of the second carriage frame, and into a corresponding normal coupling aperture of the second normal coupling aperture row of the third carriage frame, and a respective threaded coupling fastener extending through each normal coupling aperture of the first normal coupling aperture row of the third carriage frame, through a corresponding one of the lateral coupling apertures of the fourth carriage frame, and into a corresponding normal coupling aperture of the second normal coupling aperture row of the first carriage frame.

* * * * *